US012463902B2

(12) United States Patent
Chen et al.

(10) Patent No.: US 12,463,902 B2
(45) Date of Patent: Nov. 4, 2025

(54) DEPLOYING IPv6 ROUTING

(71) Applicant: Palo Alto Networks, Inc., Santa Clara, CA (US)

(72) Inventors: Jia Chen, Palo Alto, CA (US); Shu Lin, Saratoga, CA (US); Jining Tian, Saratoga, CA (US); Enke Chen, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 411 days.

(21) Appl. No.: 17/961,252

(22) Filed: Oct. 6, 2022

(65) Prior Publication Data

US 2024/0121187 A1    Apr. 11, 2024

(51) Int. Cl.
*H04L 45/741* (2022.01)
*H04L 45/02* (2022.01)

(52) U.S. Cl.
CPC ............ *H04L 45/741* (2013.01); *H04L 45/02* (2013.01)

(58) Field of Classification Search
CPC .............................. H04L 45/741; H04L 45/02
USPC ........................................................ 370/392
See application file for complete search history.

(56) References Cited

U.S. PATENT DOCUMENTS

| | | | | |
|---|---|---|---|---|
| 7,359,393 | B1* | 4/2008 | Nalawade | H04L 45/033 370/254 |
| 7,388,865 | B2* | 6/2008 | Parent | H04L 45/00 370/466 |
| 11,985,007 | B2* | 5/2024 | Sundararajan | H04L 12/4666 |
| 2013/0117449 | A1* | 5/2013 | Hares | H04L 9/40 709/225 |
| 2013/0308644 | A1* | 11/2013 | Ferguson | H04L 45/7452 370/392 |
| 2021/0409320 | A1* | 12/2021 | Wang | H04L 45/025 |
| 2023/0370372 | A1* | 11/2023 | Mishra | H04L 45/04 |
| 2023/0401274 | A1* | 12/2023 | Denninghoff | G06Q 30/0251 |
| 2024/0064099 | A1* | 2/2024 | Pang | H04L 12/185 |
| 2024/0121187 | A1* | 4/2024 | Chen | H04L 45/741 |

OTHER PUBLICATIONS

Chen et al., "Dynamic Capability for BGP-4", Oct. 20, 2021, accessed from https://datatracker.ietf.org/doc/html/draft-ietf-idr-dynamic-cap.

* cited by examiner

*Primary Examiner* — Anthony Mejia
(74) *Attorney, Agent, or Firm* — Van Pelt, Yi & James LLP (57) ABSTRACT

Techniques for deploying IPv6 routing are disclosed. A system, process, and/or computer program product for deploying IPv6 routing includes advertising in Border Gateway Protocol (BGP) a new address-family capability in combination with an existing address-family in a network that supports a plurality of address families, and undoing BGP filters to allow BGP routes to be exchanged at a time that a network administrator enables the new address-family capability in the network.

16 Claims, 9 Drawing Sheets

DEPLOYING IPv6 ROUTING

BACKGROUND OF THE INVENTION

Typically, Border Gateway Protocol (BGP) IPv6 capabilities are negotiated separately from IPv4 capabilities, BGP peers go through a re-establishment process when enabling IPv6, and there is extensive traffic loss when adding the IPv6 capabilities. As an example, assuming that a network includes 500 BGP nodes and when all of the nodes go through a re-establishment process at the same time, a BGP peer will exit a graceful restart (GR) state, and BGP routes will be deleted from a data plan (or the BGP routes will no longer be preserved). Since there are no routes to various destinations, the traffic will be dropped until routing reconverges and new BGP routes are newly installed in the data plan. This re-establishment process takes between a few minutes or as long as 20 minutes depending on the commit process over the entire network which can be distributed over a cloud globally (e.g., via Google Cloud Platform (GCP) or Amazon Web Services (AWS)).

For example, when an enterprise network includes hundreds of firewalls running only IPv4, to enable IPv6 on the hundreds of firewalls, a commit push is sent to all remote firewalls, via a central management device of the whole network, and provides a new configuration to each and every firewall on the enterprise network. For each firewall receiving the new configuration, BGP will renegotiate the IPv6 capability in its OPEN message and will go through the re-establishment process causing extensive traffic loss during the re-establishment process. OPEN message is used to establish a BGP adjacency where both sides negotiate session capabilities before a BGP peering is established. BGP capabilities are designed to be negotiated at the start of a BGP session and advertised within the OPEN message, which means that BGP sessions are torn down whenever a new functionality (e.g., BGP Add Path) or an address family is configured. This loss of traffic occurs when adding any additional network capability that requires a re-establishment process.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

In some embodiments, a system/method/computer program product for deploying IPv6 routing includes advertising in BGP a new address-family capability in combination with an existing address-family in a network that supports a plurality of address families, and undoing BGP filters to allow BGP routes to be exchanged at a time that a network administrator enables the new address-family capability in the network.

In some embodiments, the system/method/computer program product further includes, during a network software upgrade, enabling BGP IPv6 capability and maintaining BGP IPv4 capability.

In some embodiments, the new address-family capability includes IPv6.

In some embodiments, the existing address-family capability includes IPv4.

In some embodiments, the network is secured by a cloud security service provider.

In some embodiments, the system/method/computer program product further includes advertising the new address-family capability in combination with the existing address-family without generating a new address-family compatible address.

In some embodiments, the system/method/computer program product further includes filtering out all new address-family compatible routes prior to deployment of a new address-family.

In some embodiments, the new address-family capability is negotiated when the existing address-family capability is negotiated.

In some embodiments, the undoing of the BGP filters to allow BGP routes to be exchanged at the time that a network administrator enables the new address-family capability in the network includes advertising the new address-family capability together with the existing address-family, and removing the BGP filters to allow BGP routes to be exchanged.

Figure 1:
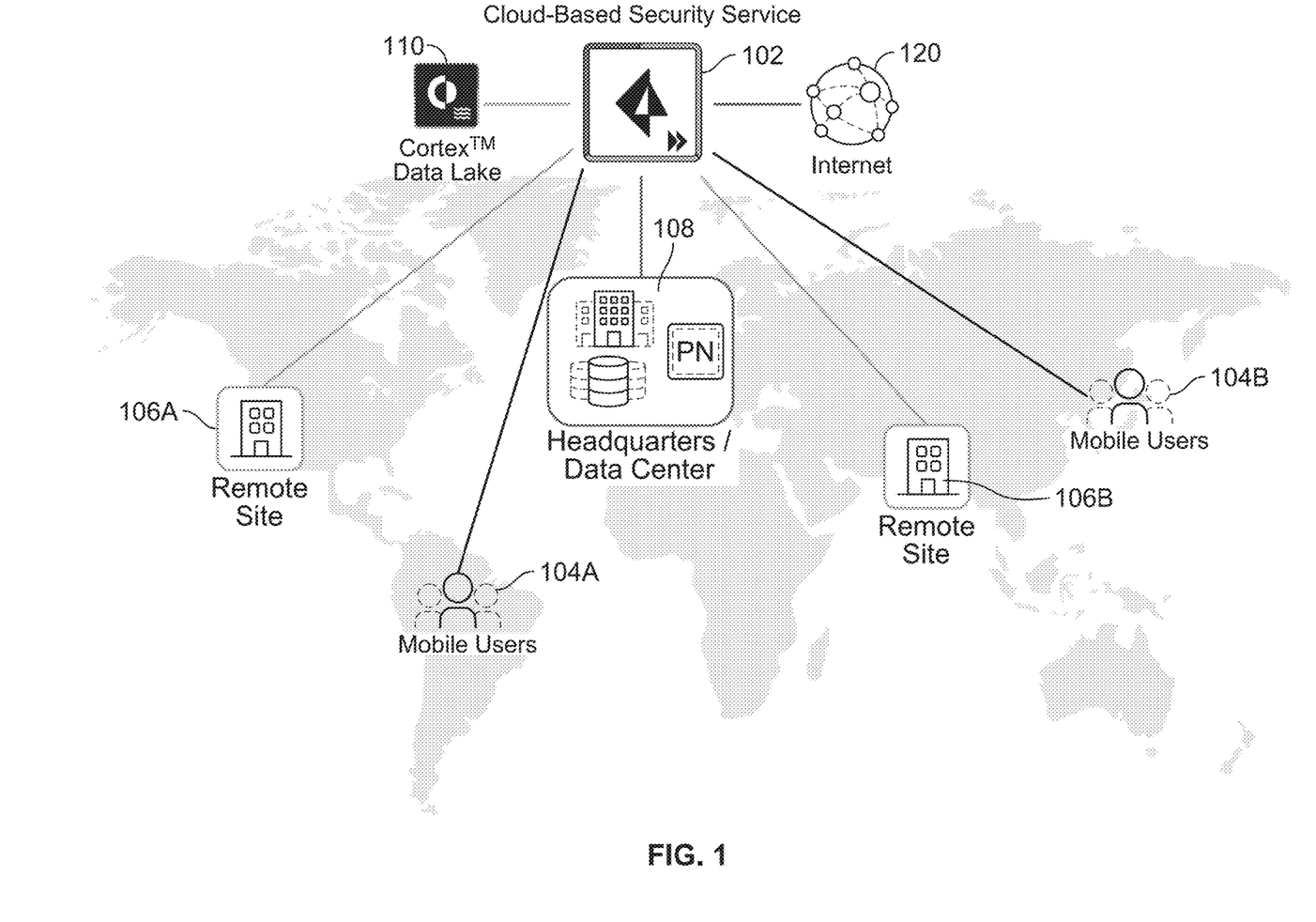
FIG. 1 is a system diagram overview of an example cloud-based security service in accordance with some embodiments.

FIG. 1 is a system diagram overview of an example cloud-based security service in accordance with some embodiments. In this example cloud-based security service shown at 102, various mobile users 104A and 104B, remote sites 106A and 106B (e.g., to secure remote network locations, such as branch offices and remote networks, and users in those branches with cloud-based next-generation firewalls), as well as a headquarters/data center 108 of an enterprise customer(s) are in communication with the cloud-based security service. A data store 110 (e.g., a Cortex™ Data Lake or another data store solution) is also in communication with the cloud-based security service for storing various logs and/or other information for the cloud-based security service.

For example, the cloud-based security service can provide various firewall, VPN (e.g., establishing IPsec tunnels using one or more IP address pools to allow the service to assign IP addresses for the client VPN tunnels to facilitate secure communication between, for example, internal resources in the customer's enterprise network, the enterprise customer's mobile users, and users in their remote network/site locations), and other security related services for the mobile users, remote sites, and headquarters/data center based on policies (e.g., security policies configurable by the enterprise customer), such as for secure access to web sites/services (e.g., including SaaS provider services) on the Internet shown at 120.

Figure 2A:
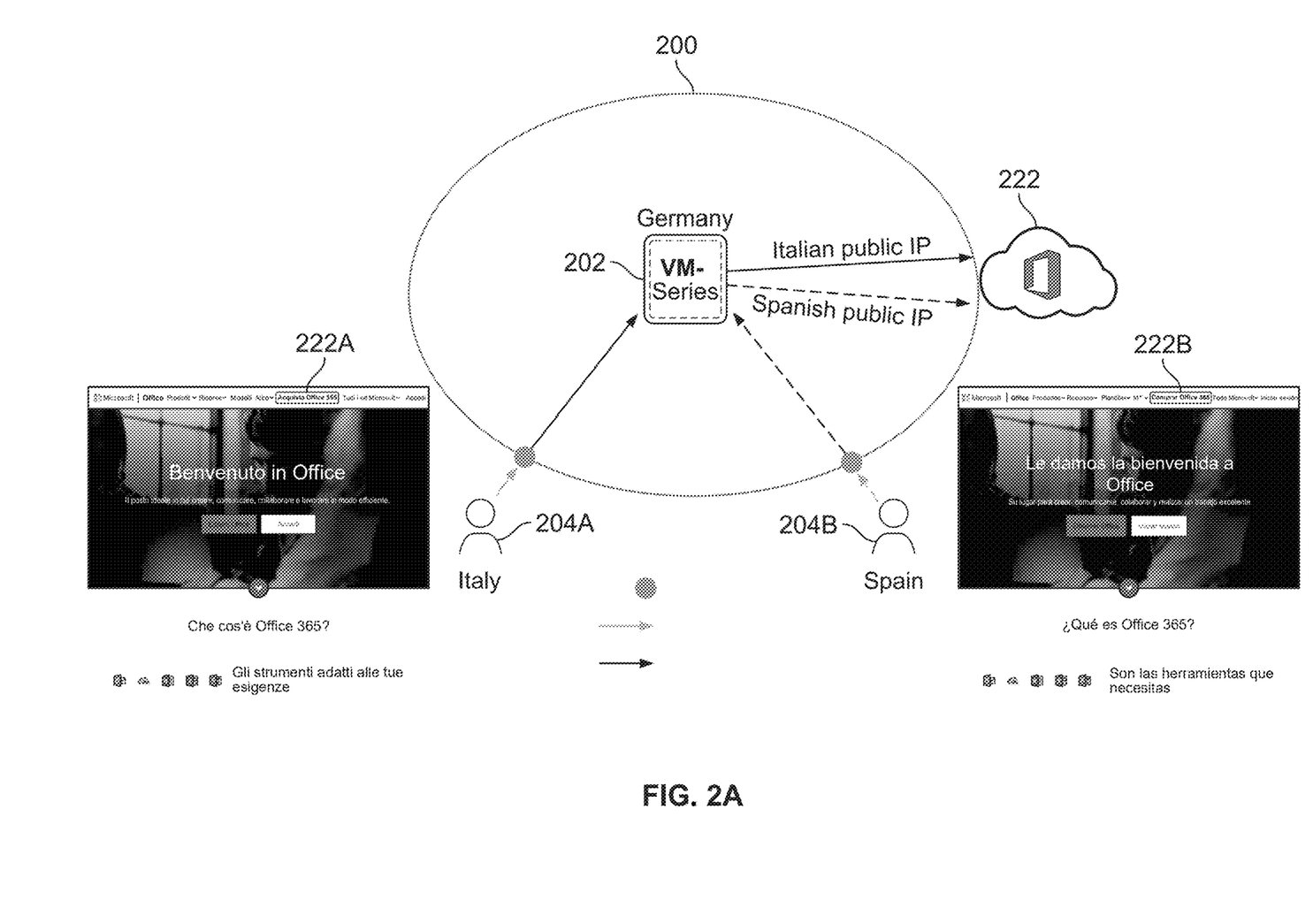
FIG. 2A is a system diagram of an example cloud-based security service in accordance with some embodiments.

FIG. 2A is a system diagram of an example cloud-based security service in accordance with some embodiments. For example, a cloud-based security service 200 can be implemented using a commercially available public cloud solution, such as the Google Cloud Platform (GCP), to facilitate a low latency for supported SaaS providers (e.g., Microsoft Office 365® as shown and/or other supported SaaS providers, such as Salesforce®, etc.) as well as implementing the disclosed techniques for an enhanced local experience for users of the cloud-based security service when they are connecting to web sites/services on the Internet including such SaaS provider solutions available on the Internet. As will be apparent to one of ordinary skill in the art, the disclosed techniques can similarly be implemented using public cloud solutions that are commercially available from other public cloud service providers, a combination of various public cloud service providers, or also by using regional data centers maintained/controlled by the cloud-based security service provider, or any combination thereof.

Referring to FIG. 2A, a network gateway 202 of cloud-based security service 200 is implemented as a virtual network gateway 202 (e.g., a security platform, such as a firewall solution available from Palo Alto Networks, Inc., or another commercially available security platform solution can similarly be configured to implement the network gateway as disclosed herein) executing on a server in a data center. In this example, the network gateway is executed on a server in a data center of the GCP located in Germany. A user 204A, who is located in Italy, is securely connected (e.g., via an IPsec tunnel or another secure/Virtual Private Network (VPN) connection) to network gateway 202 that is located in Germany (e.g., the cloud-based security service provides an agent that is executed on the endpoint device of user 204A to automatically and securely connect the user to the nearest regional network gateway, in which the enterprise customer can, for example, select locations in the cloud-based security service that function as cloud-based network gateways to secure their mobile users, such as will be further described below). Similarly, a user 204B, who is located in Spain, is securely connected to network gateway 202 that is located in Germany. In an example implementation, the cloud-based security service also provides an agent (not shown) (e.g., an endpoint agent, such as the GlobalProtect agent available from Palo Alto Networks, Inc.) that can be executed on various computing platforms such as the endpoint devices (e.g., endpoint devices executing various Operating Systems (OSs), such as Linux OS, Microsoft Windows® OS, Apple Mac OS®, Apple iOS®, and Google Android® OS) of users 204A and 204B (e.g., as well as of other users and data appliances, servers, etc.) that facilitates such automatic and secure connections to the nearest gateway and/or based on other criteria (e.g., latency, workload balancing, etc.).

As shown in FIG. 2A, using the disclosed techniques, network gateway 202 automatically performs a Source NAT (SNAT) operation to assign an Italian public IP address (e.g., a public IP address that is associated with the geo location of Italy) as the egress IP address to be associated with the session for user 204A when connecting with the Microsoft Office 365® service shown at 222. Similarly, network gateway 202 automatically performs a SNAT operation to assign a Spanish public IP address (e.g., a public IP address that is associated with the geo location of Spain) as the egress IP address to be associated with the session for user 204B when connecting with the Microsoft Office 365® service shown at 222.

As shown at 222A and 222B, users 204A and 204B of the cloud-based security service can connect through network gateway 202 to access various SaaS applications, such as Microsoft Office 365® (e.g., and/or other Internet web sites/services), and such will be rendered/provided in the local language associated with each user's respective location as a result of the above-described SNAT operations performed by network gateway 202 (e.g., absent such SNAT operations, the SaaS applications such as Microsoft Office 365® would infer that the users are located in Germany based on the public IP address(es) associated with network gateway 202 that is located in Germany (e.g., a public IP address(es) that is associated with the geo location of Germany), which would not provide a desirable user localization experience).

Moreover, the public cloud provider, GCP in this example, provides high-speed network connectivity from each of their various regional cloud-based computing service data centers to one or more SaaS providers including Microsoft Office 365® (e.g., using the GCP premium network that utilizes Google owned fiber network connections from their regional cloud platform sites to various SaaS provider sites). As a result, users 204A and 204B of cloud-based security service 200 would also experience a lower latency when connecting to network gateway 202 to access such SaaS provider solutions (e.g., Microsoft Office 365®) thereby further enhancing the user experience when using the SaaS provider solution securely via the cloud-based security service.

Figure 2B:
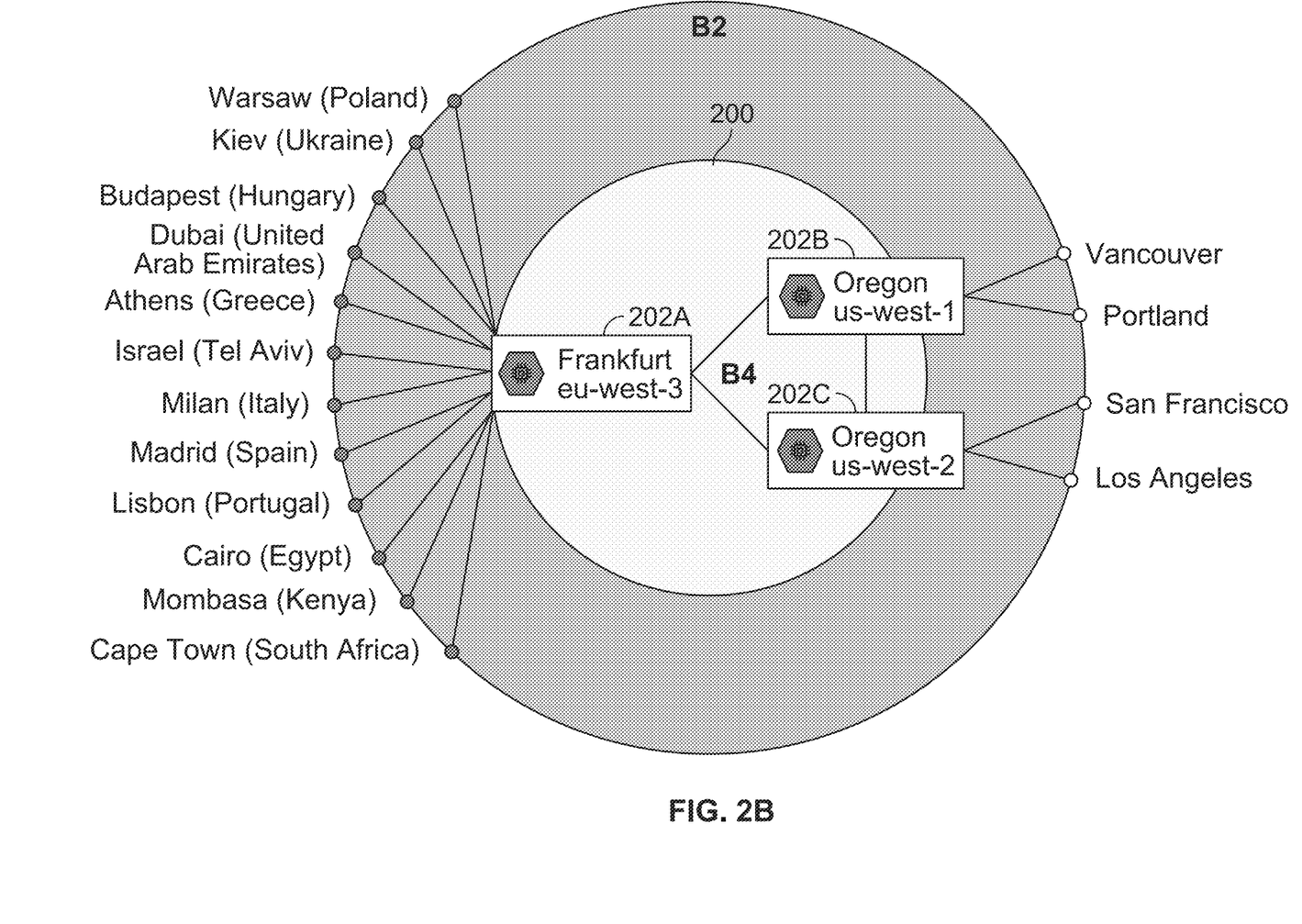
FIG. 2B is another system diagram of an example cloud-based security service in accordance with some embodiments.

FIG. 2B is another system diagram of an example cloud-based security service in accordance with some embodiments. In this example, network gateways 202A, 202B, and 202C of a cloud-based security service 200 are located in different geo locations as shown. As also shown, users of the cloud-based security service that are each located in different locations/regions can be automatically and securely connected to a network gateway of the cloud-based security service provider, such as further described below. For example, users located in Warsaw (Poland) are connected to a network gateway 202A in an eu-west-3 data center located in Frankfurt, Germany; users located in Vancouver, Canada are connected to a network gateway 202B in a us-west-1 data center located in Oregon, United States; and users located in San Francisco, CA are connected to a network gateway 202C in a us-west-2 data center also located in Oregon, United States. In an example implementation, the cloud-based security service can be implemented using a public cloud platform, such as GCP, that currently provides over 130 network edge locations (PoPs), and also provides for a low latency, low loss network with reduced Internet Service Provider (ISP) hops for users of the cloud-based security service to access various supported SaaS solutions as similarly described above.

In one embodiment, the disclosed network gateways (e.g., network gateway 202 of FIG. 2A and network gateways 202A-C of FIG. 2B) are configured to enforce policies (e.g., security policies) regarding communications between client devices and between client devices and servers/other devices, such as users/devices 204A and 204B (e.g., any endpoint device that can perform network communications) and, for example, external destinations (e.g., which can include any devices, servers, and/or web sites/services outside of a protected/secured enterprise network, which are reachable via an external network, such as the Internet). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers, etc. In some embodiments, the network gateway is also configured to enforce policies with respect to traffic that stays within a protected/secured enterprise network (not shown in FIGS. 2A and 2B).

Figure 3:
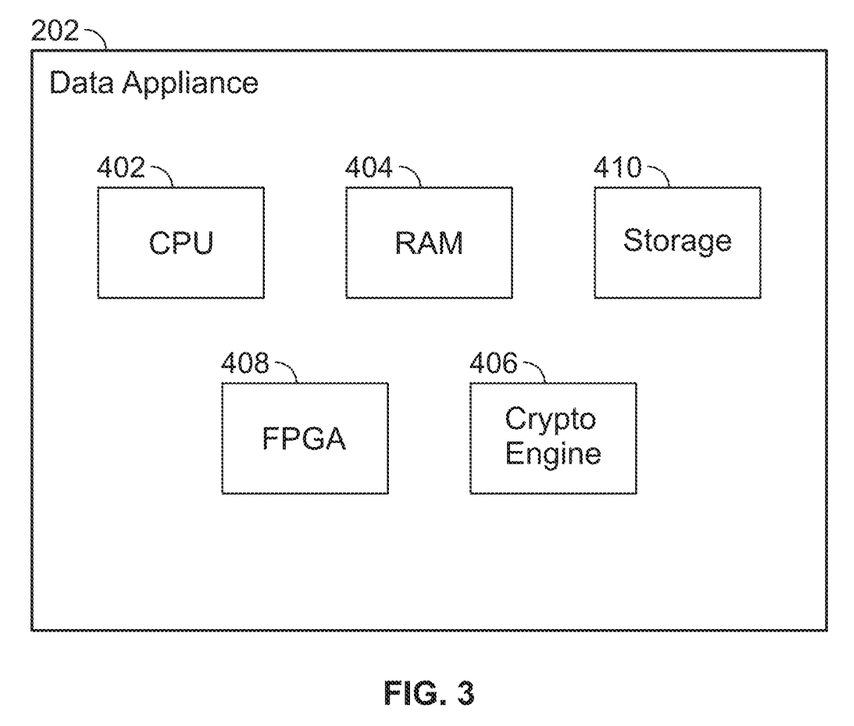
FIG. 3 illustrates an embodiment of a network gateway in accordance with some embodiments.

An embodiment of network gateway 202 is shown in FIG. 3. The example shown is a representation of physical components that can be included in network gateway 202 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., client device 204A) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of clouds in different deployment scenarios, such as the following: (1) public cloud; (2) private cloud on-premises; and (3) inside high-end physical firewalls, and some processing power can be allocated to execute a private cloud (e.g., using the management plane (MP) in the Palo Alto Networks PA-5200 Series firewall appliances).

Figure 4:
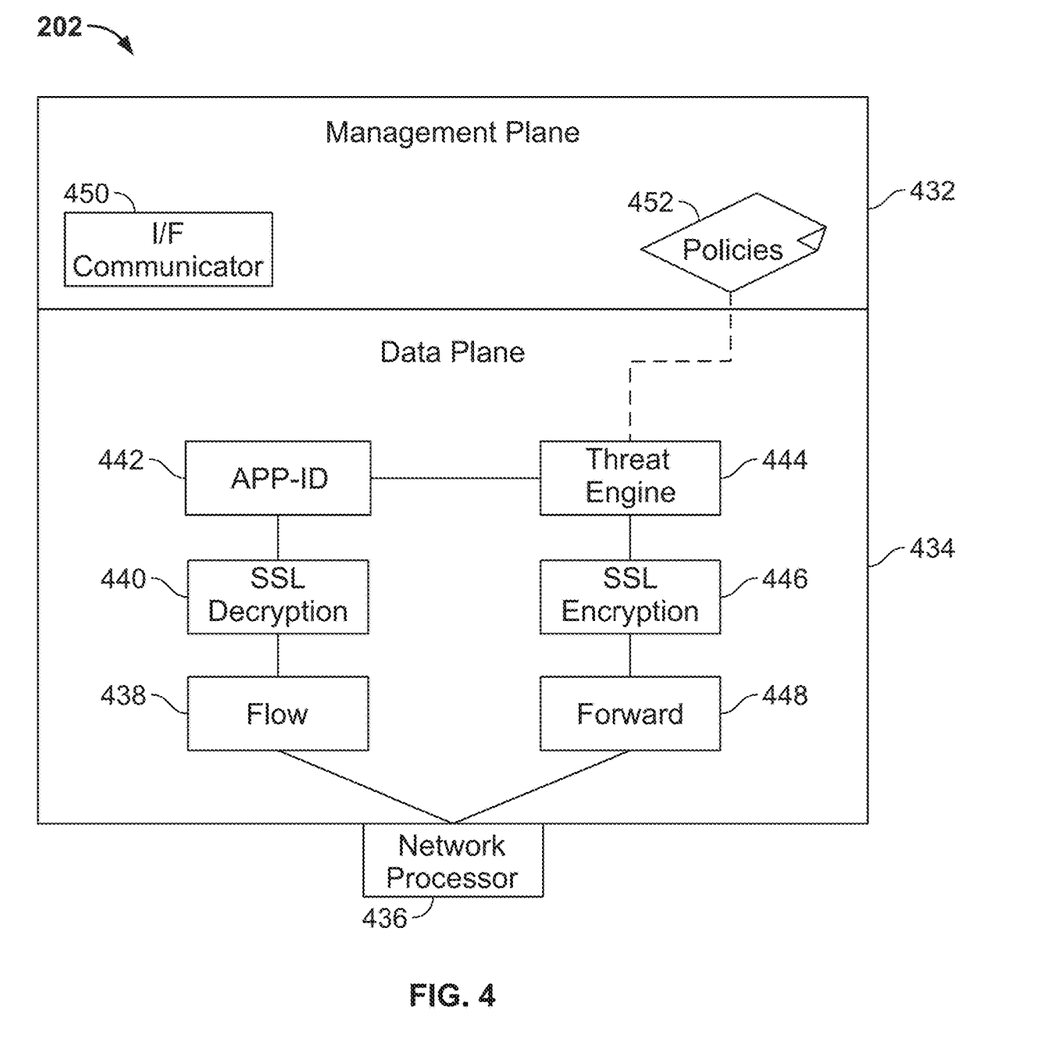
FIG. 4 is a functional diagram of logical components of an embodiment of a data appliance.

FIG. 4 is a functional diagram of logical components of an embodiment of a data appliance. The example shown is a representation of logical components that can be included in network gateway 202 in various embodiments. Unless otherwise specified, various logical components of network gateway 202 are generally implementable in a variety of ways, including as a set of one or more scripts (e.g., written in Java, python, etc., as applicable).

As shown, network gateway 202 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices, such as client devices 204A and 204B, and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 202 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., a web browsing session, the identified application can change, and such changes will be noted by network gateway 202. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Figure 5:
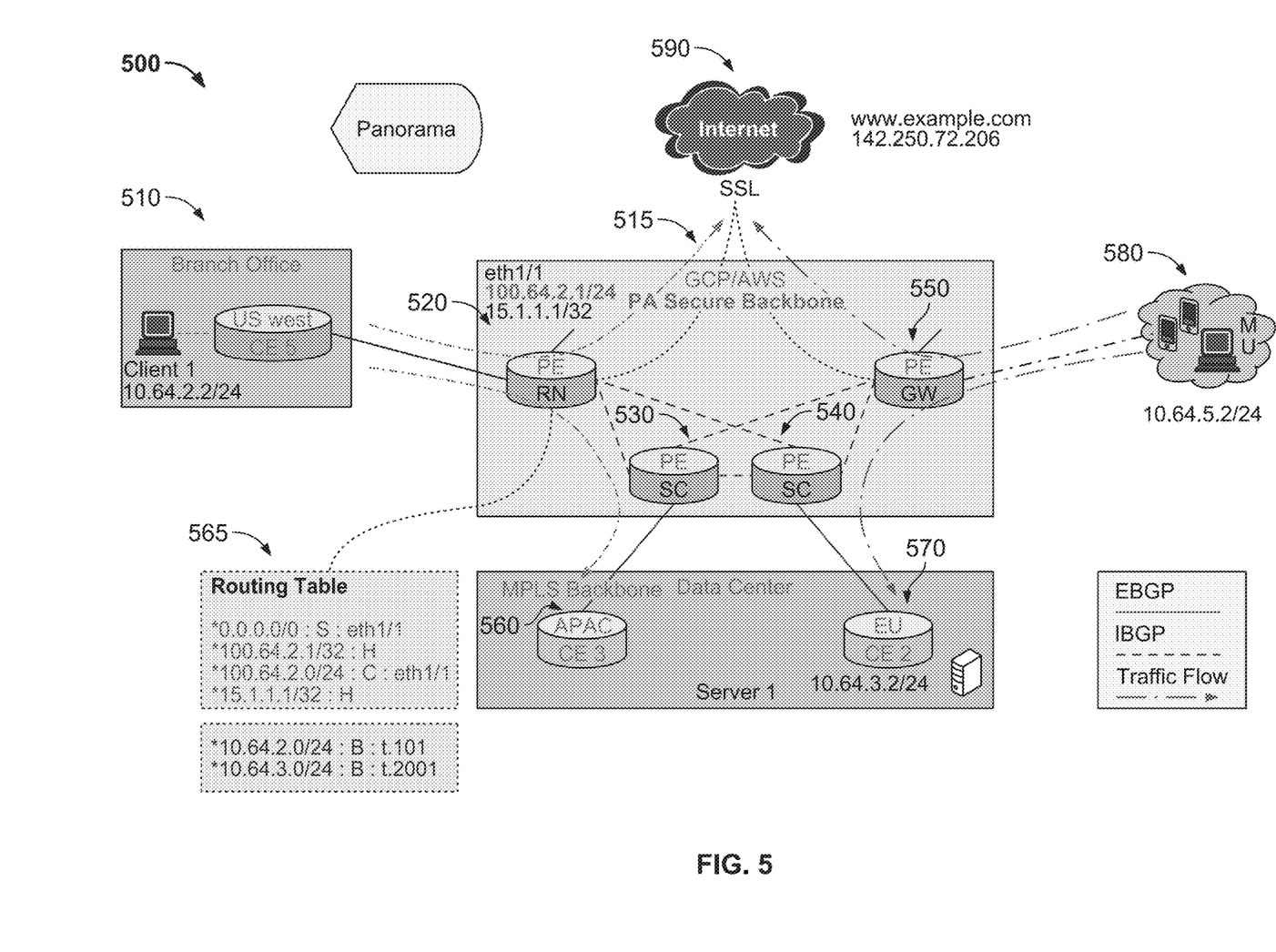
FIG. 5 is a system diagram overview of an example cloud-based security service undergoing an IPv4-to-IPv6 transition in accordance with some embodiments.

FIG. 5 is a system diagram overview of an example cloud-based security service undergoing an IPv4-to-IPv6 transition in accordance with some embodiments. In some embodiments, a network 500 includes a client 510, a cloud-based security service 515 including firewalls or nodes 520, 530, 540, and 550, a data center including a server 560 and a server 570, a branch office including a client 580, and the Internet 590.

In some embodiments, a routing table 565 is associated with firewall or node 520 and the routes include IPv4 routes. In some embodiments, the client 580 includes one or more mobile users (MU).

As an example, the network 500 is running exclusively IPv4. In other words, no computers have an IPv6 address and the nodes on the network do not have any IPv6 routes in the routing tables. As an aspect, because of IPv4 address exhaustion, to grow their network 500, a customer can at least implement IPv6 to grow their network (add additional IPv6 addresses to their network 500).

As an example, conventionally, when IPv6 is first implemented on the network 500, links within the cloud-based security service 515 between the firewall 520, the firewall 530, the firewall 540, and the firewall 550 and links between the edge of the cloud-based security service (the firewall 530 and the firewall 540) and the edge of the customer network (the server 560 and the server 570) receive a commit push. Upon receiving a new configuration enablement (e.g., turning on IPv6 capabilities), the network 500 assigns new IPv6 addresses to each node of the network 500 and as a result, BGP sessions will tear down its connections, and each node will renegotiate their IPv6 capability via OPEN message and will drop their network traffic. The extent that the network traffic is lost can relate to the size of the network 500. Typically, a larger network has more BGP nodes and/or BGP peers, and the nodes are distributed all over a larger geographical area, so it typically takes longer for larger networks to transmit routes to each other and reconverge. In other words, as the network size (e.g., number of nodes) increases, the more network traffic will be lost.

BGP is a protocol for exchanging routing information between the cloud-based security service and customer network/branch offices used to build a routing table in the various nodes. The routing table 565 is an example of a routing table built via BGP. In IPv4, an IP address of a node on the network corresponds with a 32-bit number, which is used worldwide, and to route traffic correctly, each IP address on the network needs to be unique. Currently, all possible 32-bit numbers have been used up, and no new IPv4 IP addresses are available, so new addresses to be added are IPv6 IP addresses, which are 128-bit addresses.

Network migrations from IPv4 to IPv6 have been occurring for many years (decades even). For large networks, customers typically have to schedule network downtime when IPv6 network capability is added to the network, especially for BGP, because adding IPv6 is disruptive to a network caused by large amounts of traffic loss.

As to be described, for customers running a "pure" IPv4 network, upon upgrading their network (e.g., a software upgrade, maintenance upgrade, etc.), the upgraded nodes of the network will not undergo a re-establishment process because the network will have IPv6 capabilities already enabled. For new customers, the network will initially have IPv6 capabilities enabled.

Figure 6:
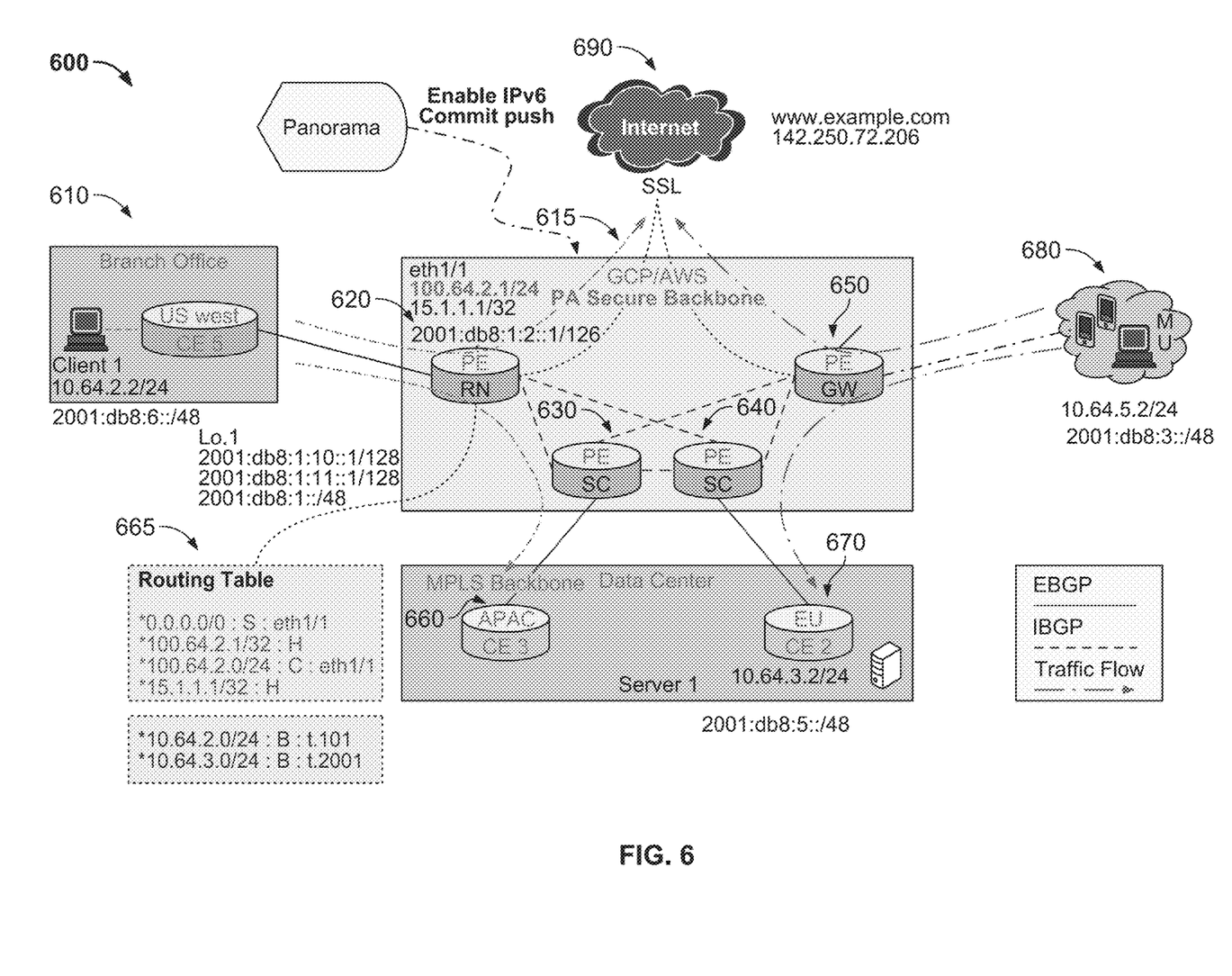
FIG. 6 is a system diagram overview of an example cloud-based security service enabling IPv6 in accordance with some embodiments.

FIG. 6 is a system diagram overview of an example cloud-based security service enabling IPv6 in accordance with some embodiments. In some embodiments, the network 600 includes a client 610, a cloud-based security service 615 including firewalls or nodes 620, 630, 640, and 650, a data center including a server 660 and a server 670, a client 680, and the Internet 690.

In some embodiments, a routing table 665 is associated with firewall or node 620 and the routes of the routing table 665 include both IPv4 routes and IPv6 routes. In some embodiments, the client 680 includes one or more mobile users (MU).

When the customer of the cloud-based security service 615 upgrades their existing IPv4 only network, BGP IPv6 capability is enabled for all BGP nodes/peers. Therefore, IPv6 BGP capability can be enabled well ahead of the actual deployment. Furthermore, because only IPv6 BGP capability is enabled, local IPv6 routes are not generated and remote IPv6 routes are rejected by proper policy in this state. As an example, because the IPv6 configuration is not yet enabled, IPv6 routes are only generated when the IPv6 configuration is enabled. In another example, the received BGP routes are rejected by installing an import deny policy which filters out/rejects received IPv6 routes. When a customer starts IPv6 deployment by enabling IPv6 (e.g., a cloud-based security service configuration), no further BGP capability negotiation is needed to be performed, therefore a BGP peer session re-establishment process and extensive traffic loss are avoided. Mobile User (MU) IP pool creation, IPv6 route creation, IPv6 route redistribution, IPv6 route distribution, and IPv6 interface address assignment are only started after IPv6 is enabled.

The deployment of IPv6 can be implemented in two steps. The first step is to advertise the IPv6 address-family capability together with IPv4 address-family capability, and as an aspect, IPv6 addresses are not generated and all IPv6 routes are filtered out. As an example, IPv6 capability is enabled when the capability is included in a BGP OPEN message, and the BGP peers agree on adding this capability, which means that the BGP peers have the IPv6 address-family capability. The second step, when an administrator enables IPv6 on the network, is to undo the filters to allow IPv6 routes to be exchanged. As an example, the administrator sends out a broadcast instructing the firewalls/nodes to remove IPv6 filters (e.g., remove the previously installed import deny filter, and as a result, the previously installed import deny policy will be deleted. This is in contrast to a scenario where IPv6 capability is negotiated after IPv6 is enabled by an operator (e.g., via configuration from the cloud-based security service). No late IPv6 capability negotiation and there is no need for a BGP protocol change are benefits of this IPv6 deployment. In other words, for existing customers, when cloud-based security service software is upgraded, all BGP IPv6 capability will be enabled. For new customers, BGP IPv6 capability will be enabled during initial onboarding.

The difference between the new capabilities and conventional capabilities is: in both scenarios at configuration time (e.g., during a network upgrade), the sessions go down and the nodes are only advertising IPv4 capabilities before going down. Upon starting up again, for the new capabilities, the nodes are also newly advertising IPv6 capabilities. On the other hand, upon starting up again, for conventional capabilities, the nodes are still merely advertising IPv4 capabilities.

As an aspect, for the new capabilities, although IPv6 is not enabled, after the network upgrade, the network begins to newly advertise IPv6 capabilities and a filter is applied to block IPv6 routes, so when IPv6 is enabled, the filter blocking the IPv6 routes is removed. The IPv6 capabilities advertisement with the filter blocking the IPv6 routes applied allow the IPv6 capabilities to be pre-negotiated between the nodes of the cloud-based security service, so, for example, nodes can negotiate whether they are capable of supporting IPv6 ahead of actual enablement of the IPv6 address capabilities. By pre-negotiating the IPv6 capabilities, a later disruption to the network is avoided when enabling IPv6 capabilities because IPv6 capabilities have been pre-negotiated.

The network software can be upgraded for various reasons that do not include adding IPv6 capabilities because the network software typically already includes IPv6 capabilities; however, the network software may need to be upgraded to support a new standard, apply software patch, apply security patch, etc.

Also, the new capabilities do not create an IPv6 local address, do not send or advertise IPv6 routes, and filter out or ignore IPv6 routes received from other nodes.

A BGP graceful restart is effective when only a very small number of BGP speakers (or nodes) are restarting, for example, only one BGP peer is restarting. The graceful restart provides non-stop forwarding which will keep the traffic continually being forwarded while waiting for routing reconvergence to occur for a certain period, for example, 120 seconds. However, a BGP graceful restart is not as helpful when a large number of BGP speakers (or nodes) are restarting at the same time, which would make BGP exit the graceful restart state immediately.

One advantage of the present application over existing technologies includes BGP peers no longer need to go through a re-establishment process when administrators enable IPv6 through normal configurations, so no extensive traffic loss occurs. Another advantage of the present application includes that a new protocol or a BGP protocol extension is not required. For example, in an IETF draft (https://datatracker.ietforg/doc/html/draft-ietf-idr-dynamic-cap-16), a new BGP message type CAPABILITY message has been proposed for negotiating BGP IPv6 capability instead of using OPEN message, which already exists as a BGP message type.

The present application can be applied to other BGP address family capabilities (e.g., IPv4 unicast, IPv4 multicast, labeled IPv4, NG-MVPN IPv4, MDT-SAFI, L3VPN IPv4 unicast, L3VPN IPv4 multicast, RT-Constrain, Flowspec, IPv6 unicast, IPv6 multicast, labeled IPv6 (6PE), NG-MVPN IPv6, L3VPN IPv6 unicast, L3VPN IPv6 multicast, Flow-IPv6, CLNS VPN, MS-PW, BGP-VPLS/BGP-L2VPN, EVPN, etc.) and is not limited to IPv6.

Figure 7:
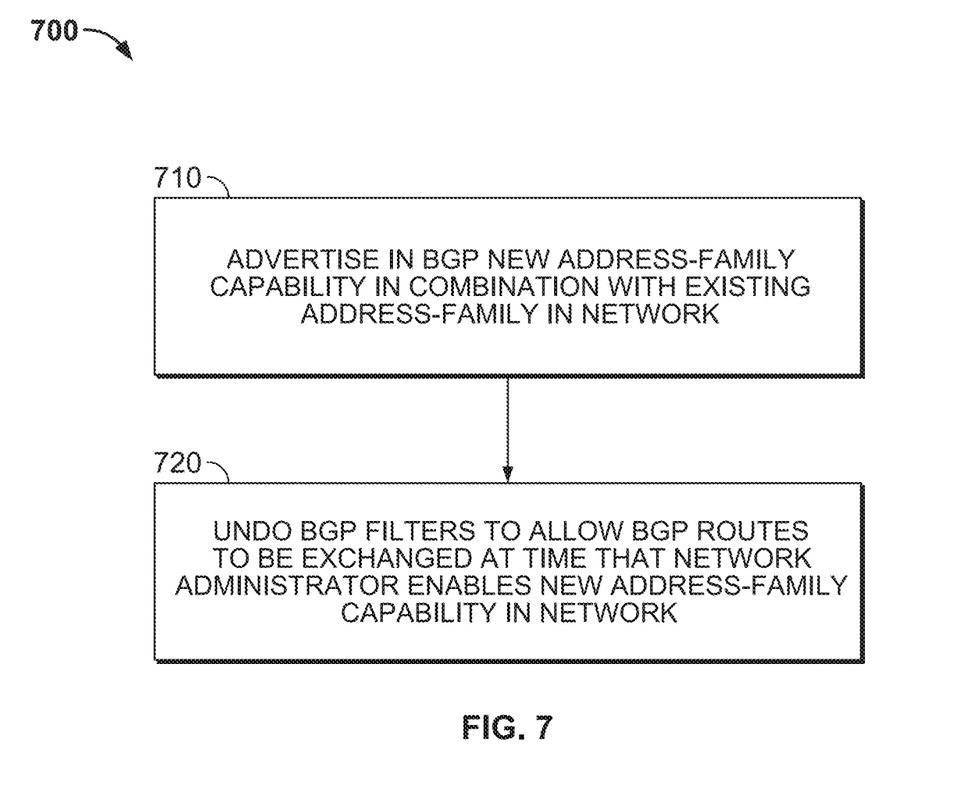
FIG. 7 is a flow diagram illustrating a process for deploying IPv6 routing in accordance with some embodiments.

FIG. 7 is a flow diagram illustrating a process for deploying IPv6 routing in accordance with some embodiments. In some embodiments, the process 700 is implemented by a cloud-based security service 515 of FIG. 5 and/or a cloud-based security service 615 of FIG. 6 and comprises:

In 710, the cloud-based security service advertises in BGP a new address-family capability in combination with an existing address-family in a network that supports a plurality of address families. In some embodiments, the new address-family capability includes IPv6. In some embodiments, the existing address-family capability includes IPv4. In some embodiments, the network is secured by a cloud security service provider. In some embodiments, the cloud-based security service advertises the new address-family capability in combination with the existing address-family without generating an IPv6 address. In some embodiments, the cloud-based security service filters out all IPv6 routes prior to deployment.

In 720, the cloud-based security service undoes BGP filters to allow BGP routes to be exchanged at a time that a network administrator enables the new address-family capability in the network.

Some of the advantages of process 700 include BGP IPv6 capabilities are negotiated when IPv4 capabilities are negotiated, so BGP peers do not need to undergo a re-establishment process when IPv6 is enabled. As a result, there is no traffic loss during the transition to add IPv6 network capabilities.

Figure 8:
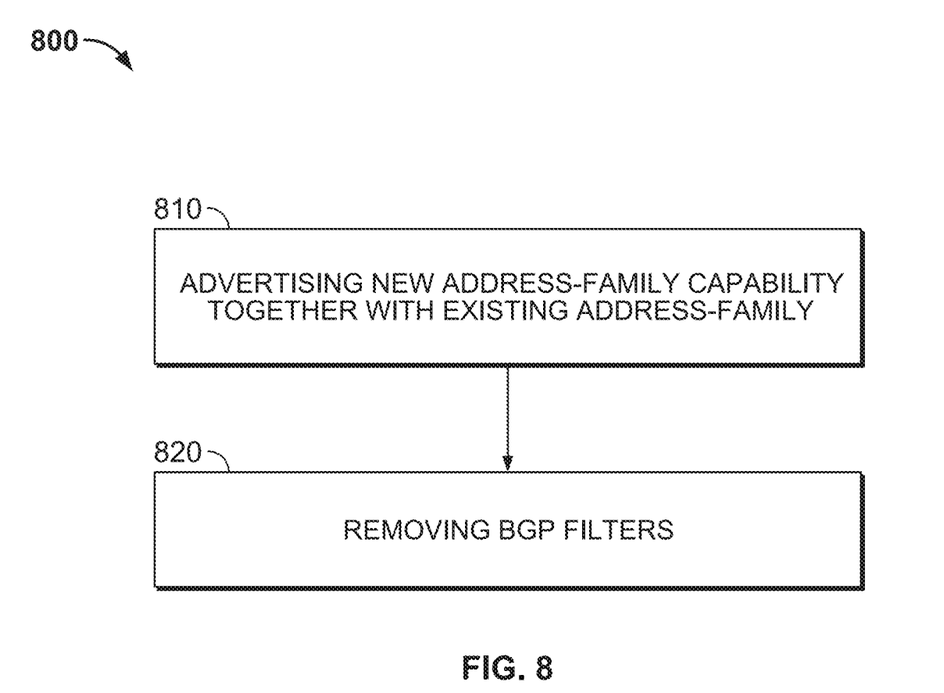
FIG. 8 is a flow diagram illustrating a process for undoing BGP filters to allow BGP routes to be exchanged in accordance with some embodiments.

FIG. 8 is a flow diagram illustrating a process for undoing BGP filters to allow BGP routes to be exchanged in accordance with some embodiments. In some embodiments, process 800 is an implementation of operation 720 of FIG. 7 and comprises:

In 810, the cloud-based security service advertises in Border Gateway Protocol (BGP) a new address-family capability in combination with an existing address-family in a network that supports a plurality of address families. In some embodiments, the new address-family capability corresponds to IPv6, and the existing address-family capability corresponds to IPv4.

In 820, the cloud-based security service undoes BGP filters to allow BGP routes to be exchanged at the time that a network administrator enables the new address-family capability in the network.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      advertise in Border Gateway Protocol (BGP) a new address-family capability in combination with an existing address-family in a network that supports a plurality of address families;
      undo BGP filters to allow BGP routes to be exchanged at a time that a network administrator enables the new address-family capability in the network; and
      filter out all new address-family compatible routes prior to deployment of a new address-family; and
   a memory coupled to the processor and configured to provide the processor with instructions.

2. The system of claim 1, wherein the processor is further configured to:
   during a network software upgrade, enable BGP IPv6 capability and maintain BGP IPv4 capability.

3. The system of claim 1, wherein the network is secured by a cloud security service provider.

4. The system of claim 1, wherein the processor is further configured to:
   advertise the new address-family capability in combination with the existing address-family without generating a new address-family compatible address.

5. A system, comprising:
   a processor configured to:
      advertise in Border Gateway Protocol (BGP) a new address-family capability in combination with an existing address-family in a network that supports a plurality of address families, wherein the new address-family capability is negotiated when an existing address-family capability is negotiated; and
      undo BGP filters to allow BGP routes to be exchanged at a time that a network administrator enables the new address-family capability in the network; and
   a memory coupled to the processor and configured to provide the processor with instructions.

6. A system, comprising:
   a processor configured to:
      advertise in Border Gateway Protocol (BGP) a new address-family capability in combination with an existing address-family in a network that supports a plurality of address families; and
      undo BGP filters to allow BGP routes to be exchanged at a time that a network administrator enables the new address-family capability in the network, comprising to:
         advertise the new address-family capability together with the existing address-family; and
         remove the BGP filters to allow the BGP routes to be exchanged, and
   a memory coupled to the processor and configured to provide the processor with instructions.

7. A method, comprising:
   advertising in Border Gateway Protocol (BGP) a new address-family capability in combination with an existing address-family in a network that supports a plurality of address families;
   undoing BGP filters to allow BGP routes to be exchanged at a time that a network administrator enables the new address-family capability in the network; and
   filtering out all new address-family compatible routes prior to deployment of a new address-family.

8. The method of claim 7, further comprising:
   during a network software upgrade, enabling BGP IPv6 capability and maintain BGP IPv4 capability.

9. The method of claim 7, wherein the network is secured by a cloud security service provider.

10. The method of claim 7, further comprising:
    advertising the new address-family capability in combination with the existing address-family without generating a new address-family compatible address.

11. A method, comprising:
    advertising in Border Gateway Protocol (BGP) a new address-family capability in combination with an existing address-family in a network that supports a plurality of address families, wherein the new address-family capability is negotiated when an existing address-family capability is negotiated; and
    undoing BGP filters to allow BGP routes to be exchanged at a time that a network administrator enables the new address-family capability in the network.

12. A method, comprising:
    advertising in Border Gateway Protocol (BGP) a new address-family capability in combination with an existing address-family in a network that supports a plurality of address families; and
    undoing BGP filters to allow BGP routes to be exchanged at a time that a network administrator enables the new address-family capability in the network, comprising:
       advertising the new address-family capability together with the existing address-family; and
       removing the BGP filters to allow the BGP routes to be exchanged.

13. A computer program product embodied in a non-transitory computer readable medium and comprising computer instructions for:
    advertising in Border Gateway Protocol (BGP) a new address-family capability in combination with an existing address-family in a network that supports a plurality of address families;
    undoing BGP filters to allow BGP routes to be exchanged at a time that a network administrator enables the new address-family capability in the network; and
    filtering out all new address-family compatible routes prior to deployment of a new address-family.

14. A computer program product embodied in a non-transitory computer readable medium and comprising computer instructions for:

advertising in Border Gateway Protocol (BGP) a new address-family capability in combination with an existing address-family in a network that supports a plurality of address families, wherein the new address-family capability is negotiated when an existing address-family capability is negotiated; and undoing BGP filters to allow BGP routes to be exchanged at a time that a network administrator enables the new address-family capability in the network.

15. A computer program product embodied in a non-transitory computer readable medium and comprising computer instructions for:

advertising in Border Gateway Protocol (BGP) a new address-family capability in combination with an existing address-family in a network that supports a plurality of address families; and undoing BGP filters to allow BGP routes to be exchanged at a time that a network administrator enables the new address-family capability in the network, comprising:

advertising the new address-family capability together with the existing address-family; and removing the BGP filters to allow the BGP routes to be exchanged.

16. The system of claim 1, wherein:

IPv6 address-family capability corresponds with the new address-family capability;

IPv4 corresponds with the existing address-family;

IPv6 corresponds with the new address-family; and the undoing of the BGP filters comprises to:

filter out all IPv6 routes using IPv6 filters prior to deployment of the new address-family capability; and undo the IPv6 filters during the deployment of the new address-family capability.

* * * * *